United States Patent
Schmidt

(10) Patent No.: US 6,595,525 B2
(45) Date of Patent: Jul. 22, 2003

(54) ATTACHABLE SEALANT BEAD AND STRIP FOR USE WITH A VEHICLE PART

(76) Inventor: Glen D. Schmidt, 30845 23 Mile Rd., New Baltimore, MI (US) 48047

(*) Notice: Subject to any disclaimer, the term of this patent is extended or adjusted under 35 U.S.C. 154(b) by 73 days.

(21) Appl. No.: 09/770,016

(22) Filed: Jan. 25, 2001

(65) Prior Publication Data

US 2002/0096839 A1 Jul. 25, 2002

(51) Int. Cl.⁷ ............................................. F16J 15/02
(52) U.S. Cl. ................... 277/630; 277/637; 277/644
(58) Field of Search ........................ 277/628, 630, 277/637, 644, 650, 652, 906

(56) References Cited

U.S. PATENT DOCUMENTS

| | | | |
|---|---|---|---|
| 3,839,248 A | 10/1974 | Clark et al. | |
| 4,356,676 A | 11/1982 | Hauptman | |
| 4,468,042 A * | 8/1984 | Pippert et al. | 277/638 |
| 4,643,863 A | 2/1987 | Martini | |
| 4,691,928 A * | 9/1987 | Abele | 277/639 |
| 4,834,824 A | 5/1989 | Tiedeck | |
| 4,978,164 A | 12/1990 | Nakamura et al. | |
| 5,126,185 A * | 6/1992 | Forrest et al. | 361/218 |
| 5,139,715 A | 8/1992 | Katsuno et al. | |
| 5,147,546 A | 9/1992 | Tadayon | |
| 5,164,136 A | 11/1992 | Comert et al. | |
| 5,234,246 A | 8/1993 | Henigue et al. | |
| 5,234,639 A | 8/1993 | Smith | |
| 5,246,519 A | 9/1993 | McCormick | |
| 5,259,646 A | 11/1993 | Snyder | |
| 5,318,207 A * | 6/1994 | Porter et al. | 222/387 |
| 5,320,896 A | 6/1994 | Smith | |
| 5,391,336 A | 2/1995 | Akitomo et al. | |
| 5,440,849 A | 8/1995 | Agrawal et al. | |
| 5,601,328 A * | 2/1997 | Bruhnke et al. | 156/108 |
| 5,615,898 A * | 4/1997 | Clark et al. | 277/596 |
| 5,641,438 A | 6/1997 | Bunyan et al. | |
| 5,746,858 A * | 5/1998 | Finkbeiner | 156/108 |
| 5,910,524 A | 6/1999 | Kalinoski | |
| 5,981,610 A | 11/1999 | Meguriya et al. | |
| 6,027,088 A | 2/2000 | Stedman et al. | |
| 6,054,001 A | 4/2000 | Swanson et al. | |
| 6,056,527 A | 5/2000 | Bunyan et al. | |
| 6,073,987 A | 6/2000 | Lindberg et al. | |
| 6,086,709 A | 7/2000 | Hills | |
| 6,096,413 A | 8/2000 | Kalinoski et al. | |
| 6,112,469 A * | 9/2000 | Vuillemot et al. | 49/475.1 |
| 6,485,030 B1 * | 11/2002 | Hahn et al. | 277/645 |

FOREIGN PATENT DOCUMENTS

| | | | | |
|---|---|---|---|---|
| CH | 640 303 | * | 12/1983 | |
| CH | 640303 A5 | * | 12/1983 | E06B/7/23 |

* cited by examiner

Primary Examiner—Anthony Knight
Assistant Examiner—Doug Hutton
(74) Attorney, Agent, or Firm—Gifford, Krass, Groh, Sprinkle, Anderson & Citkowski, P.C.

(57) ABSTRACT

A sealing gasket for use with a vehicle part, the part having a specified shape with at least one sealing surface. The gasket includes a carrier strip constructed of a flexible material having a first face and a second face, a specified width and thickness and further being constructed of a high-tear strength plasticized material. An adhesive is exhibited upon the first face of material and includes a tacking surface applied to or impregnated with the first face of the carrier strip. A peel-away backing surface is secured over the first face of material. At least one elongate bead of material is fixedly applied to the second face in a desired pattern, the bead typically including a foam-in-place silicone material. The adhesive surface is applied to the sealing surface of the part, after removal of the peel-away backing, to affix the carrier strip and so that the bead pattern projects from the sealing surface.

7 Claims, 2 Drawing Sheets

ATTACHABLE SEALANT BEAD AND STRIP FOR USE WITH A VEHICLE PART

BACKGROUND OF THE INVENTION

1. Field of the Invention

The present invention relates generally to foam-in-place seals for use in automotive parts and the like. More particularly, the present invention relates to a combination foam-in-place seal and reverse faced adhesive strip manufactured independently of the vehicle component to which it is subsequently applied.

2. Description of the Prior Art

Foam-in-place gaskets and seals are relatively well known in the prior art, particularly in use with vehicle automotive parts such as brake plate modules or other associated components. The gasket/seal provides a degree of environmental insulation to the passenger compartment, such as by sealing the interior compartment from external moisture and other contaminants, as well as by providing a measure of sound protection. Traditionally, parts requiring foam-in-place beads or seals usually achieve a bond through mechanical or chemical bonding to one of the part's surfaces. The part with the seal is then mechanically or otherwise attached to an opposing surface to complete the seal.

Referring to FIG. 1, an example is illustrated at 2 in the prior art of a silicone based and foam-in-place gasket applied directly to a conventional and typically bulky part such as a vehicle brake plate module 4. The brake plate module 4, as is well known in the art, attaches at a specified location of the vehicle floor board (not shown) and includes apertures 6 and 8 defined to communicate the steering column and brake control pedals with the vehicle's engine compartment and to further facilitate mounting of the brake cylinder (also not shown). As is also well known, a plurality of bolts or like fasteners 10 engage the module 4 to the vehicle frame.

The foamable-in-place gasket is again specifically illustrated at 12 and is applied as a desired arrangement of elongated beads directly to the abutting or sealing face of the part, typically in mass production applications by an assembly including a computer numeric controller (CNC), a robotic arm and an extruded silicone delivery system. In many instances, it is typical that the vehicle part (such as again including the brake plate module) is manufactured at a first location and the part is then shipped to a second location for application of the gasket sealant. The part is then typically reshipped back to the first location or to a further assembly location for incorporation within the vehicle.

While providing an effective assembly for producing a formable-in-place sealant gasket directly to a vehicle component, it has been found that significant cost and delay are encountered in shipping the part between the producer, sealant applicator and vehicle assembler. It has further been determined to be impracticable, particularly from an economic perspective, to combine the part manufacture and robotic sealant application steps at one location. This is due in large measure to the disparity in the technology required to stamp the part (relatively straightforward), as opposed to that required to apply the gasket sealant in a repetitive and highly accurate fashion (more sophisticated).

Another example of a method of making a foamed-in-place gasket is set forth in U.S. Pat. No. 4,834,824, issued to Tiedeck and which teaches a coated release board mounted upon a work support and upon which is robotically applied a continuous sealant bead in a predetermined pattern corresponding to a pattern of securing engagement of a workpiece, such as a window assembly, to a vehicle body. The gasket and cardboard release board assemblies are stacked in cartons and shipped to a further location where additional method steps are employed, including applying the sealant bead and release board to the workpiece with the sealant bead retained in securing engagement with the work piece. Thereafter, the release board is stripped from the sealant bead and the work piece (window assembly) is secured to the support such as a vehicle body.

U.S. Pat. No. 5,440,849, issued to Agrawal et al., teaches a vehicular panel assembly and method for making which includes a gasket formed of a polymeric material located within a support fixture for bonding to a sheet-like panel. At least one panel surface to receive the gasket is primed with a bonding reagent and is typically preheated before receiving the gasket. The panel and preset gasket are then pressed together and locator pins are used to position the panel with respect to the gasket. Once located, heat and pressure are applied to complete the bond.

U.S. Pat. No. 4,643,863, issued to Martini, teaches a process for depositing, on a non-adhesive support, a thread of fluid material for gasket manufacture from a nozzle displaced above the support along a path coinciding with the gasket layout. A stiff, wire-like reinforcement is placed on the support before deposition and corresponds to the shape of the gasket to be manufactured. The reinforcement further includes an adhesive surface with respect to the fluid material of the gasket to facilitate the creation of a bond therebetween.

Finally, U.S. Pat. No. 4,356,676, issued to Hauptman, teaches a sealant strip for use between abutting building elements, such as structural elements/logs or the like. The sealant strip is constructed as a generally three dimensional shaped object and includes a synthetic foamed resin core and a pressure sensitive adhesive coating on at least one of two opposed sides of the core. Thin, preferably silicone rubber sealing layers are cured on the two remaining surfaces of the core. The strip is adapted for adhesive attachment to and compression between structural members, with the core supporting the edges of the sealing layers in contact with the opposed surfaces of the structural elements between which the strip has been compressed.

SUMMARY OF THE PRESENT INVENTION

The present invention is a combination attachable sealant bead and strip for application to a vehicle part as a gasket, which provides the same quality and degree of sealing and insulation as provided by prior art mechanically/chemically bonded foam-in-place seals, and which is also an improvement over the prior art in that the bead and strip can be separately produced and then shipped to the part manufacturer for low tech and adhesive application to the part. The present invention improves over conventional procedures which require that the manufactured part, due to economic realities, be shipped to an application station for application of the gasket and then reshipped to the eventual vehicle assembler. The ability to separately produce and ship the bead and strip gasket to the part manufacture results in significant savings of time and money.

The gasket is typically in the form of a carrier strip constructed of a flexible material, such as a high-tear strength polyester, polyolefin, polyolefin foam or polystyrene, with a specified width and thickness and which includes a first face and a second face. The first face of the carrier strip is impregnated with an adhesive and tacking surface. A peel-away backing surface is secured over the first face of material.

One or more elongate beads of material are fixedly applied upon the second face of the carrier strip in a desired pattern. The beads of material are in the preferred embodiment a foam-in-place silicone material which, upon curing, affixingly secures to the second (typically shiny) surface of the plasticized carrier strip.

In use, the carrier strip defines a pattern or loop of given shape and the adhesive surface is applied to the sealing surface of the part, after removal of the peel away backing surface, to affix the carrier strip and so that the bead pattern projects from the opposite second face and in a direction away from the part's sealing surface. The construction of the carrier strip and bead provides adequate sealing against petroleum, water and air at operating temperatures ranging between $-30°$ C. and $180°$ C. and in use as a gasket to seal an area defined between an engaging and sealing surface of the part and an opposing surface, such as again typically including a vehicle passenger compartment or some other desirable application.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
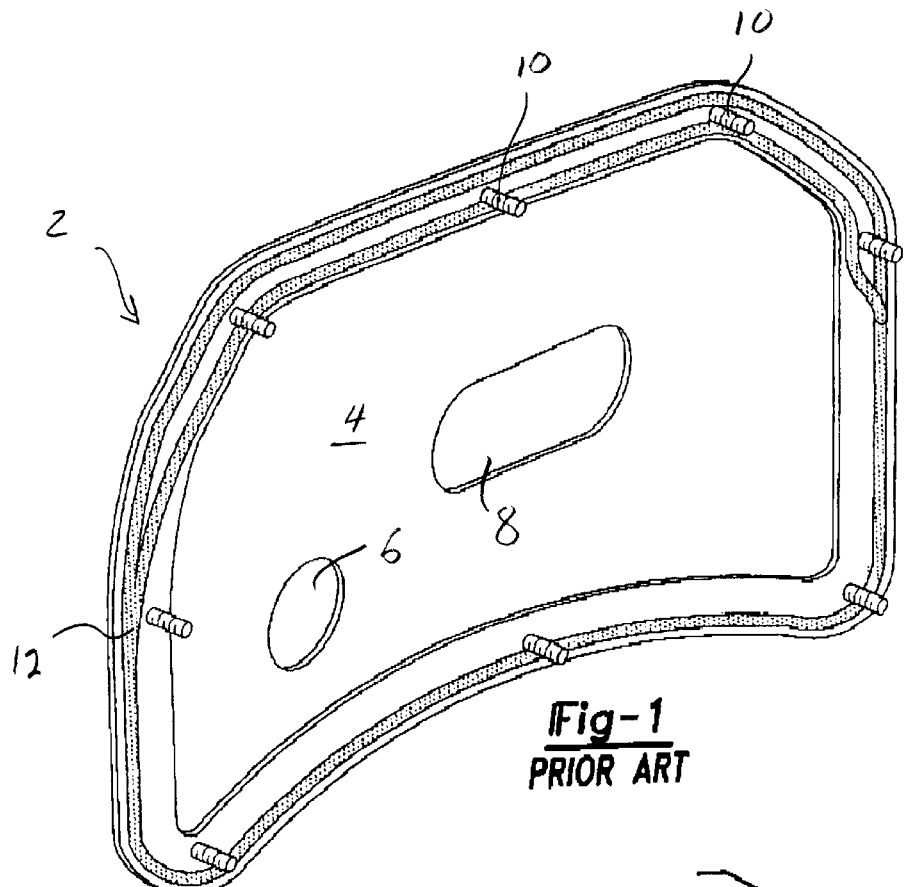
FIG. 1. is a perspective view of a foam-in-place gasket according to an example set forth in the prior art.
Figure 2:
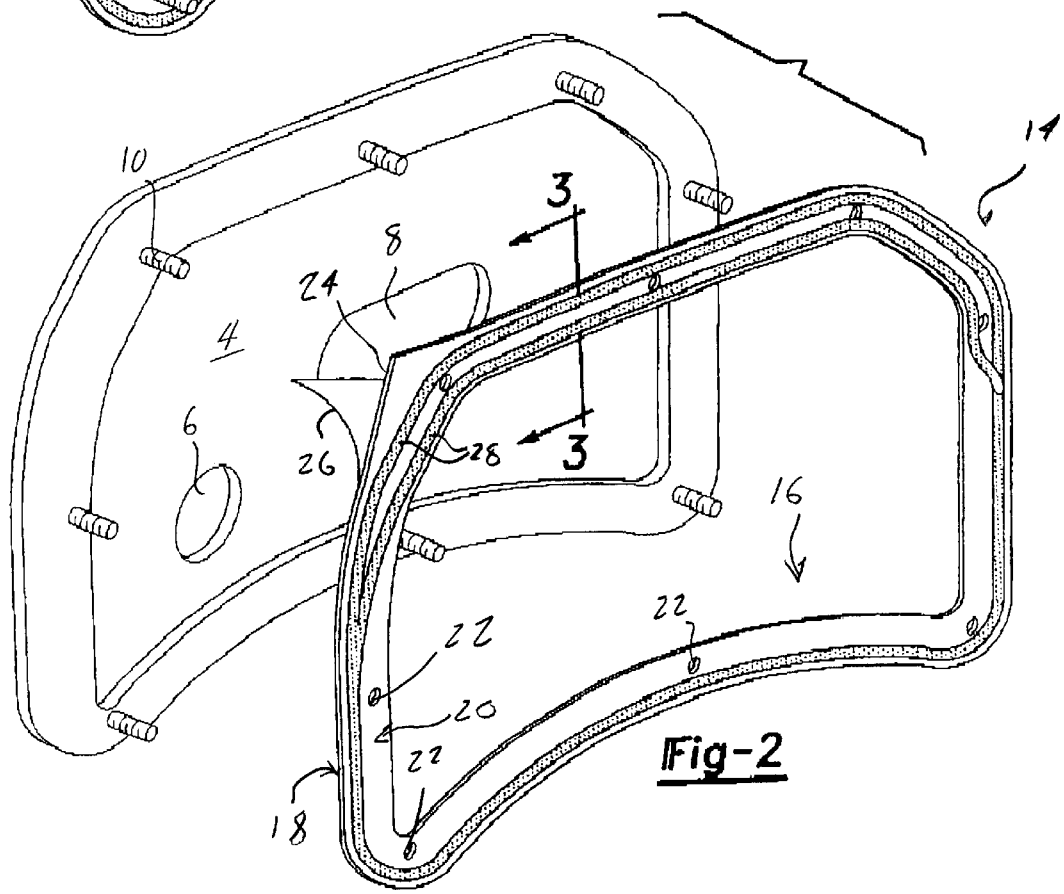
FIG. 2 is an exploded view of the combination carrier strip and seal according to the preferred embodiment of the present invention in use with a vehicle part.

Referring to FIG. 2, a sealing gasket is illustrated at 14 for use with a vehicle part, such as a brake plate module 4. The part 4 (or other suitable part) is, as previously described in reference to FIG. 1 and the prior art, well known in the art and attaches at a specified location of the vehicle floor board or firewall (not shown). The part 4 again in the application shown is again typically a brake plate module and includes apertures 6 and 8 defined to communicate the steering column and brake control pedals with the vehicle's engine compartment and to further facilitate mounting of the brake cylinder (also not shown). As is also well known, a plurality of bolts or like fasteners 10 project from the sealing surface of the part and engage to the vehicle frame.

The gasket 14 is, according to the preferred embodiment, provided as a combination carrier strip and bead seal. The carrier strip is identified at 16 and is provided as a generally elongated member with a specified width and thickness and further includes a first face 18 and a second opposite face 20. The strip 16 is further typically constructed of a flexible material, such as a plasticized material including such as a high-tear strength polyester, polyolefin, polyolefin foam or polystyrene.

The carrier strip 16 may also be configured in a closed loop pattern, as illustrated in FIG. 2, and so that it may be applied to the opposing and sealing surface of the part 4 in a desired fashion. The plurality of mounting fasteners 10, extending from the sealing surface of the conventional part 4, are received within a corresponding arranged plurality of aligning apertures 22 defined within the carrier strip 16 and for affixing and aligning the gasket 14 to the part 4 as will now be described.

Figure 3:
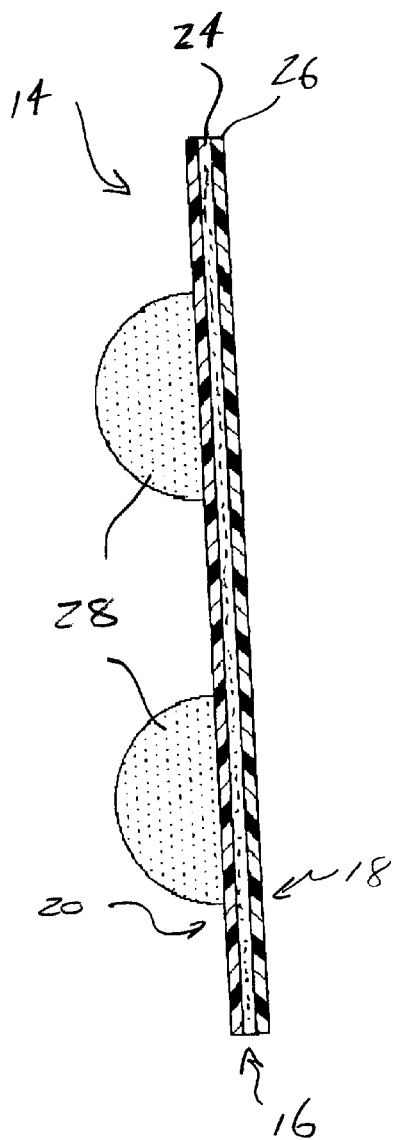
FIG. 3 is a cutaway view taken along line 3—3 of FIG. 2 and illustrating in cross section the construction of the carrier strip and seal according to the present invention.
Figure 4:
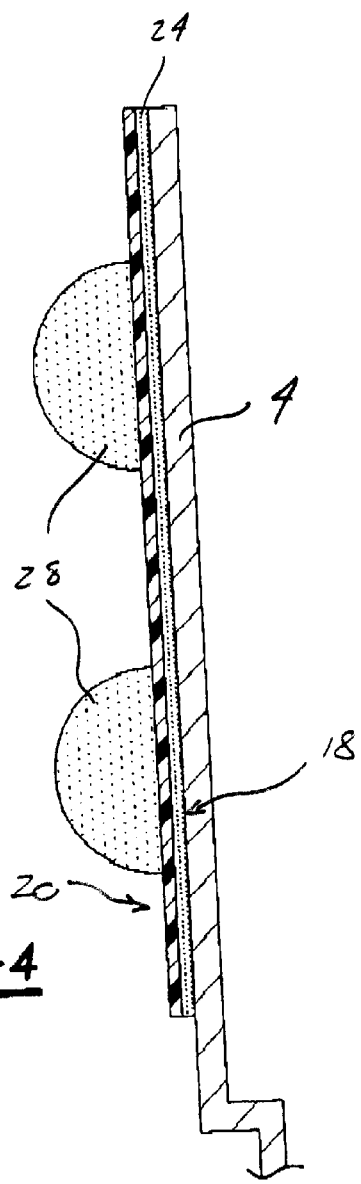
FIG. 4 is a view similar to that shown in FIG. 3 and further illustrating the combination carrier strip and seal affixingly and adhesively secured to the sealing surface of the vehicle part.

The first face 18 of the carrier strip 16 is impregnated with an adhesive and tacking material 24, see particularly FIGS. 3 and 4. The adhesive/tacking material 24 is, in one preferred embodiment, a roll coated material. Alternatively, the tacking material is applied in a heat impregnation manner. A peel-away backing surface 26 is secured over the first face 18 of the carrier strip 16 and, as illustrated in FIG. 2, is removed from the first face 18 upon applying the strip 16 to the sealing surface of the part 4. It is further understood that, regardless of its manner of application, the tacking material 24 provides a sufficient degree of holding force between the gasket 14 and the sealing surface of the part, and which will maintain the carrier strip 16 in engagement with the part 4 in an environment in which contaminants such as petroleum, water, air are present, such as at temperatures ranging between $-30°$ C. and $180°$ C.

One or more elongate beads 28 of material are fixedly applied upon the second face 20 of the carrier strip 16 in a desired pattern. In particular, a closed loop or other suitable pattern is employed to replicate the geometry of the part 4. To ensure that the part is properly located when attached to the opposing surface (not shown) of the desired installation application, align holes 22 in the proper pattern.

The beads 28 of material are further, in the preferred embodiment, a foam-in-place silicone material such as that described in reference to the prior art description of FIG. 1 and which, upon curing, affixingly secures to the second (typically shiny) surface 20 of the plasticized carrier strip 16. It is also understood that the silicone beads 28 are affixed to the second surface 20 in a chemically and/or mechanically bonding fashion and which by itself is known in the art.

The construction of the beads 28, as with the carrier strip 16 and tacking surface 24, provides adequate sealing against petroleum, water and air at operating temperatures again ranging at least between $-30°$ C. and $180°$ C. and in use as a gasket to seal an area defined between an engaging and sealing surface of the part and the opposing surface at the desired mounting location. It is also understood that, while silicate based materials are disclosed as constituting the beads 28 of material, other suitable types of material could also be used in place of silicates, such materials including additional types of plasticized and/or rubberized materials and which provide the necessary characteristics of flexibility, sealability and durability dependent upon the requirements of the particular application.

It is therefore readily apparent that the gasket 14 provides an effective combination attachable sealant bead and strip for application to a vehicle part, and which duplicates the quality and degree of sealing and insulation as provided by prior art practice of mechanically/chemically bonding a silicate based and foam-in-place seals directly to the part. As also previously stated, the carrier strip and bead gasket of the present invention is further an improvement over the prior art in that the bead and strip can be separately produced and then shipped to the part manufacturer for low tech and adhesive application to the part. This is again due to the face that the present invention improves over conventional procedures which require that the manufactured part, due to economic realities, be shipped to an application station for application of the gasket and then reshipped to the eventual vehicle assembler.

As previously stated, the ability to separately produce and ship the bead and strip gasket to the part manufacture results in significant savings of time and money. This is due in large measure to the ability to economically and quickly ship the carrier strip and bead gaskets, by themselves, to the part manufacturer, such practice resulting in significantly lowered packaging costs and storage space.

Also, the gasket of the present invention is easily replaceable if damaged, such as by simply discarding the strip and bead and affixing a suitable replacement to the part. This is not the case if the bead is damaged after being foamed-in-place directly onto the part (see again the prior art description of FIG. 1). In that instance, it is necessary to strip the beads 12 of material from the part 4 before re-sealing or, alternatively, to discard the part altogether.

It is also understood that the combination carrier strip and bead gasket may, in addition to the brake plate application illustrated, also be applied to a variety of differently configured and employed parts, such as including vehicle window trim surfaces, door sealing surfaces and effectively any other type of surface in which it is desirable to maintain a permanent air and fluid seal between a sealing surface of one part and an opposing mounting surface.

Having described my invention, additional preferred embodiments will become apparent to those skilled in the art to which it pertains and without deviating from the scope of the appended claims.

I claim:

1. A gasket for use with a vehicle brake plate module, the brake plate module having a specified shape with at least one sealing surface, said gasket comprising:

a flattened carrier strip constructed of a flexible material and including a first face and a second face, said carrier strip being provided as a substantially planar shaped member having specified width and thickness and further being constructed of a high-tear strength plasticized material selected from the group including thermoformable polyolefins, shapeable polyolefins, polystyrenes, and polyolefin foams;

an adhesive exhibited upon said first face of material, said adhesive further comprising a tacking surface applied to said first face of said carrier strip;

a peel-away backing surface secured over said first face of material; and at least one elongate bead of material fixedly applied to said second face in a desired pattern, said bead further comprising a foam-in-place silicone material exhibiting a solid configuration in cross section;

said adhesive surface being applied to the sealing surface of the part to affix said carrier strip and so that said bead pattern projects from the sealing surface.

2. A gasket for use with a vehicle part, the part having a specified shape with at east one sealing surface, said gasket comprising:

a carrier strip constructed of a first flexible material and including a first face and a second face;

an adhesive exhibited upon said first face of material, said adhesive further comprising a tacking surface applied to said first face of said carrier strip, a peel-away backing surface secured ver sad first face of material; and at least one elongate bead of a second material fixedly applied upon said second face in a desired pattern, said bead further comprising a foam-in-place silicone material and exhibiting solid and substantially semi-circular shaped configuration in cross section;

said adhesive su face being applied to the sealing surface of the part to affix said carrier strip and so that said bead pattern projects from the sealing surface.

3. The gasket as described in claim 2, said carrier strip having a specified width and thickness and further being constructed of a high-tear strength polyester.

4. The gasket as described in claim 2, said carrier strip having a specified width and thickness and further being constructed of a material selected from the group including thermoformable polyolefins, shapable polyolefins, polystyrenes and polyolefin foams.

5. The gasket as described in claim 2, said carrier strip having a specified width and thickness and typically forming a closed loop pattern.

6. The gasket as described in claim 5, the part including a plurality of mounting fasteners extending from the sealing surface, said carrier strip further comprising a plurality of apertures in alignment with the arrangement of the fasteners and for receiving the fasteners therethrough upon adhesively affixing said first face against the sealing surface.

7. A gasket for use with a vehicle part, the part having a specified shape with at least one sealing surface, said gasket comprising:

a carrier strip constructed of a flexible material exhibiting a high tear strength and including a first face and a second face, said carrier strip having a specified width and thickness and typically forming a closed loop pattern;

an adhesive exhibited upon said first face of material; and at least one elongate bead of material fixedly applied upon said second face in a desired pattern, said bead exhibiting a solid and substantially semi-circular shaped configuration in cross section;

said adhesive surface being applied to the sealing surface of the part to affix said carrier strip and so that said bead pattern projects from the sealing surface, the part further including plurality of mounting fasteners extending from the sealing surface, said carrier strip further comprising a plurality of apertures in alignment with the arrangement of th fasteners and for receiving the fasteners therethrough upon adhesively affixing said first face against the sealing surface.

* * * * *